United States Patent [19]

Muisener

[11] Patent Number: 5,006,233
[45] Date of Patent: Apr. 9, 1991

[54] WATER PURIFICATION SYSTEM

[75] Inventor: Charles M. Muisener, Newington, Conn.

[73] Assignee: Loctite Corporation, Newington, Conn.

[21] Appl. No.: 142,738

[22] Filed: Jan. 11, 1988

[51] Int. Cl.$^5$ .............................. C02F 1/32; C02F 1/52
[52] U.S. Cl. .................................. 210/96.1; 210/106; 210/143; 210/167; 210/192; 210/195.1; 210/205; 210/225; 210/251; 210/400; 422/131
[58] Field of Search ..................... 210/748, 765, 96.1, 210/104, 106, 143, 167, 169, 192, 194, 195.1, 198.1, 199, 205, 225, 227, 228, 243, 251, 258, 387, 400, 401, 416.2

[56] References Cited

U.S. PATENT DOCUMENTS

| | | | |
|---|---|---|---|
| 4,101,777 | 7/1978 | Reid | 210/251 X |
| 4,229,202 | 10/1980 | Mullerheim et al. | 210/387 X |
| 4,280,912 | 7/1981 | Berry, III et al. | 210/96.1 X |
| 4,400,270 | 8/1983 | Hillman | 210/143 X |
| 4,526,684 | 7/1985 | Seefluth | 210/104 |
| 4,752,401 | 6/1988 | Bodenstein | 210/192 X |
| 4,769,131 | 9/1988 | Noll et al. | 210/192 X |

FOREIGN PATENT DOCUMENTS 2705169 8/1978 Fed. Rep. of Germany .
51-121959 10/1976 Japan .

OTHER PUBLICATIONS

Ulinskaia, N. N. and M. S. Kleshcheva: "Gas Chromatographic Determination of the Impurity Composition in Waste Waters and Regenerated Waters During the Synthesis of Polystyrene Plastics with a Closed Water Recycling System", *Plasticheskie Massy*, 1984, No. 4, pp. 49-50.
Brochure entitled: "Introducing L.I.S. Loctite Impregnation Systems", 16 pages, copyright 1985, Loctite Corporation, Newington, Conn.; especially pertinent: pp. 10–12.
Serfilco '86 Catalog R (Rev.) entitled: "Pump Filter and Pollution Abutement Guide"; front and rear covers, and pp. 1, 32, 33, 48, and 64; of Serfilco, Ltd., Glenview, Ill.
Brochure entitled "The F450 Lamp System: Graphic Results", 7 pages, of Fusion UV Curing Systems, subsidiary of Fusion Systems Corporation, Rockville, Md.
Brochure entitled: "Ultra Dynamics Ultraviolet Water Purifiers", 6 pages, of Ultra Dynamics Corporation, Santa Monica, Calif.
One page, unnumbered, from catalog of the Upjohn Company, Fine Chemical Division, North Haven, Conn., graphically depicting the UV spectrum (absorbance as a function of wavelength) of DEAP (diethoxyacetophenone).

*Primary Examiner*—Tom Wyse
*Attorney, Agent, or Firm*—Perman & Green

[57] ABSTRACT

Apparatus for purifying rinse water used to remove excess resin from articles which have been impregnated with a sealant material. The impregnating resin is customarily a curable composition comprising acrylate monomer and anaerobic or heat cure initiator and results in the formation of an emulsion in the rinse water. A photoinitiator is added to the foregoing composition enabling the emulsion to polymerize when exposed to UV radiation. After the rinse water containing the emulsion has been so exposed, the resulting rinse water and polymer composition is filtered in one or more stages to remove the polymer, leaving substantially pure water as a result. The water, thus purified, can either be returned to the process for re-use or discharged to the environment.

26 Claims, 6 Drawing Sheets

WATER PURIFICATION SYSTEM

BACKGROUND OF THE INVENTION

1. Field of the Invention

This invention relates to apparatus for purifying water and, more particularly, for purifying rinse water resulting from an impregnation sealing process.

2. Description of the Prior Art

In the quest for lighter, better performing products at less cost, there has been a significant shift in recent years to the use of lighter metals, such as aluminum, in cast sintered form, and in composite materials. Formerly, design engineers specified materials, manufacturing techniques, and heavy casting designs based on the strategy to minimize the problem of porosity, or microporosity. Even microporosity causes air, gas, and hydraulic fluid leakage, creates finishing problems, and, in sintered articles, contributes to machine difficulties. While the former practice kept rejection rates to a minimum, this strategy severely limited design freedom. However, this attitude changed when engineers designing advanced equipment began to exploit the benefits of impregnation sealing. With impregnation sealing, the voids of naturally porous articles are sealed enabling the articles to be used for fluid power components. At the same time, the outer surfaces remain essentially unaffected allowing them to be successfully plated. Today, virtually every manufacturing industry relies heavily on impregnation sealing of porous articles.

The majority of impregnation sealing processes in use today employ self-curing anaerobic sealant materials, that is, materials which cure in the absence of air. Thermal curing sealants are also used, however. These sealant materials, or resins, are customarily a curable composition comprising acrylate monomer and anaerobic or heat cure initiator. Specifics of the chemical compositions and operation of these materials are presented in the co-pending, commonly assigned U.S. patent application Ser. No. (D.D. 87-17) filed concurrently herewith on Jan. 11, 1988 and entitled "Porous Article Impregnation Resin Composition and System for Treating Impregnation Process Waste Water". The processes used for applying the resin require steps of rinsing the article in pure water or in water containing other desirable substances.

In any impregnation sealing process, the aqueous washing of the impregnated articles to remove excess surface sealant or sealant trapped in blind holes results in passage of the excess removed resin into the aqueous washing medium. The anaerobic-cure and/or thermal-cure impregnation resins are substantially insoluble in the aqueous washing medium, resulting in the formation of a dispersion or emulsion of the impregnation resin ("emulsion"). In order to maximize excess sealant removal action in the aqueous rinse step, clean make-up water is introduced to the rinse tank either continuously or in batch fashion, with corresponding discharge of emulsion-containing water from such tank as waste water effluent.

Heretofore, this emulsion-containing waste water effluent of the impregnation process system has either been discharged directly to receiving waters, or else subjected to treatment via conventional biological effluent treatment processes, e.g., activated sludge processing, microbial digestion, and the like.

The monomer utilized in the impregnation sealing process with which the invention is concerned is considered to be nontoxic. Furthermore, although the direct discharge or biological treatment of emulsion-containing waste water from impregnation systems has been generally satisfactory from an environmental standpoint, there is nonetheless a continuing need to improve the effluent quality of discharge streams from such systems, under the impetus of increasing environmental awareness and legislative and regulatory constraints. It has become desirable, then, to reduce or eliminate the emulsion from the rinse water before disposing the rinse water or before reusing it in the process.

Throughout the application, the word "purify" and derivatives thereof used in this regard will be taken to mean the removal of the emulsion or the polymerized material from the rinse water.

Besides concern with the environment, there is an additional concern with present commonly performed disposal of such emulsion containing rinse water directly into either private septic systems or into municipal sewerage systems. Because the impregnant is often an anaerobic resin, it tends to polymerize under water and form on the walls of the discharge piping. This constricts flow of the water and eventually blocks such flow, requiring costly replacement of pipes and associated components and even of an entire septic system in the event its effectiveness becomes compromised.

One publication which is representative of the prior art in this regard is Federal Republic of Germany Offenlegungsschrift 2,705,169 laid open Aug. 10, 1978. This document discloses a process for the treatment of emulsion-like waste waters, which is said to permit practically complete purification. By adding small quantities of heat cure polymerization initiators, the liquid polymerizable substances emulsified in the waste water can be polymerized by heating, or, if accelerators are also added beside the free radical polymerization initiators, even at ambient temperature. The emulsified droplets coalesce to larger drops, which settle very rapidly without use of any other additives, and can easily be separated from the water by screening or filtration. The waste waters treated in this manner may contain, for example, mixtures or solutions of chemical compounds which have homopolymerizable or copolymerizable double bonds in the liquid polyermizable substances. Alpha beta-ethylenically unsaturated polyesters, dissolved in one or more unsaturated copolymerizable monomers, are mentioned as examples.

According to the German reference, after filtration, between 15% and 80% by weight of the polymerizable substance remains following filtration. The present invention is substantially more efficient. An additional drawback of the German reference is the fact that the operating temperatures of the process are 50°-90° C. in one instance and 60°-80° C. in another instance. These are significantly higher than the ambient temperature at which the process of the invention operates. Another significant difference of the present invention resides in the effective use, as disclosed herein and unknown to the German reference, of introducing a photoinitiator to the emulsion containing rinse water, then subjecting it to actinic radiation resulting in polymerization of the emulsion. Another noteworthy publication is Japanese Public Patent Disclosure Bulletin 51-121,159 which discloses a method for treating the eluted waste liquids resulting from the development and, subsequently elution with water, of photosensitive resins. A polymerization initiator is added to the eluted waste liquid of a photosensitive resin and the monomers in the waste liquid are caused to react by applying light or heat to it. Thereafter, cooling and ultrafiltration/concentration are performed whereupon the resulting filtrate can be reused as the eluent of the photosensitive resin while the concentrated liquid is recycled through the ultrafiltration/concentration steps until a sufficiently concentrated liquid, i.e. 10–15 times concentration, is formed. The concentrated liquid is subsequently mixed with oil and subjected to combustion treatment.

While the Japanese reference relates to a batch process, the preferred manner of operation of the present invention is continuous. Furthermore, the operating times recited in the reference are 20 to 40 minutes at elevated temperatures, 60°-95° C., preferably 80°-90° C., and, in an example, recites illumination for a duration of one hour for the effective activation of the photoinitiator. In contrast, the present invention requires less than five minutes to cycle a unit volume of the rinse water at ambient temperatures. Also, the effectiveness reported for the Japanese process is significantly less than the substantially complete removal achieved in the instance of the present invention.

SUMMARY OF THE INVENTION

The present invention, in brief, is directed toward apparatus for purifying rinse water used to remove excess resin from articles which have been impregnation sealed as previously mentioned. The resin is a monomer which is usually polymerizable anaerobically, although sometimes with heat.

The invention is based on the discovery that anaerobic- and/or heat-curing sealant compositions utilized for impregnation of porosity of porous articles may advantageously be formulated with photoinitiators and that the resulting effluent rinse water formed by aqueous washing removal of excess applied impregnant may be treated by actinic radiation exposure which is curingly effective for the monomer in the impregnant composition, followed by recovery of the resulting formed polymer from the waste water, to yield an effluent waste water substantially depleted of impregnant and polymer, suitable for discharge to receiving waters.

The apparatus of the invention generally uses existing components with a minimum of redesign. Furthermore, the purification process is performed in a manner which does not unduly detract from, or interfere with, or cause to retard, ongoing impregnation sealing processes. Additionally, while the invention is of significant benefit to the environment, another significant benefit is economic, specifically, that the water, thus purified, can be discharged to the environment, to a public municipal sewerage system, or even be recycled for use. At the present time, in contrast, certain users are required to haul away the waste water in bulk and have it treated or otherwise disposed of according to governmental regulations, all at great expense. Also, as previously noted, cured sealant can deposit on discharge piping reducing or even eliminating its effectiveness, resulting in costly repair or replacement. Accordingly, by reason of the invention, high standards of water quality established by the government are assured for the environment. Additionally, operational and maintenance costs for industry are minimized, and specialized bulk disposal of waste water is eliminated with resultant significant cost savings.

Other and further features, objects, advantages, and benefits of the invention will become apparent from the following description taken in conjunction with the following drawings. It is to be understood that the foregoing general description and the following detailed description are exemplary and explanatory but are not to be restrictive of the invention. The accompanying drawings which are incorporated in and constitute an article of this invention, illustrate some of the embodiments of the invention and, together with the description, serve to explain the principles of the invention in general terms. Like numerals refer to like parts throughout the disclosure.

DETAILED DESCRIPTION OF THE PREFERRED EMBODIMENTS

Turn now to FIGS. 1A, 1B, 1C, and 1D which depict the most commonly used impregnation sealing processes currently being practiced in industry.

Figure 1:
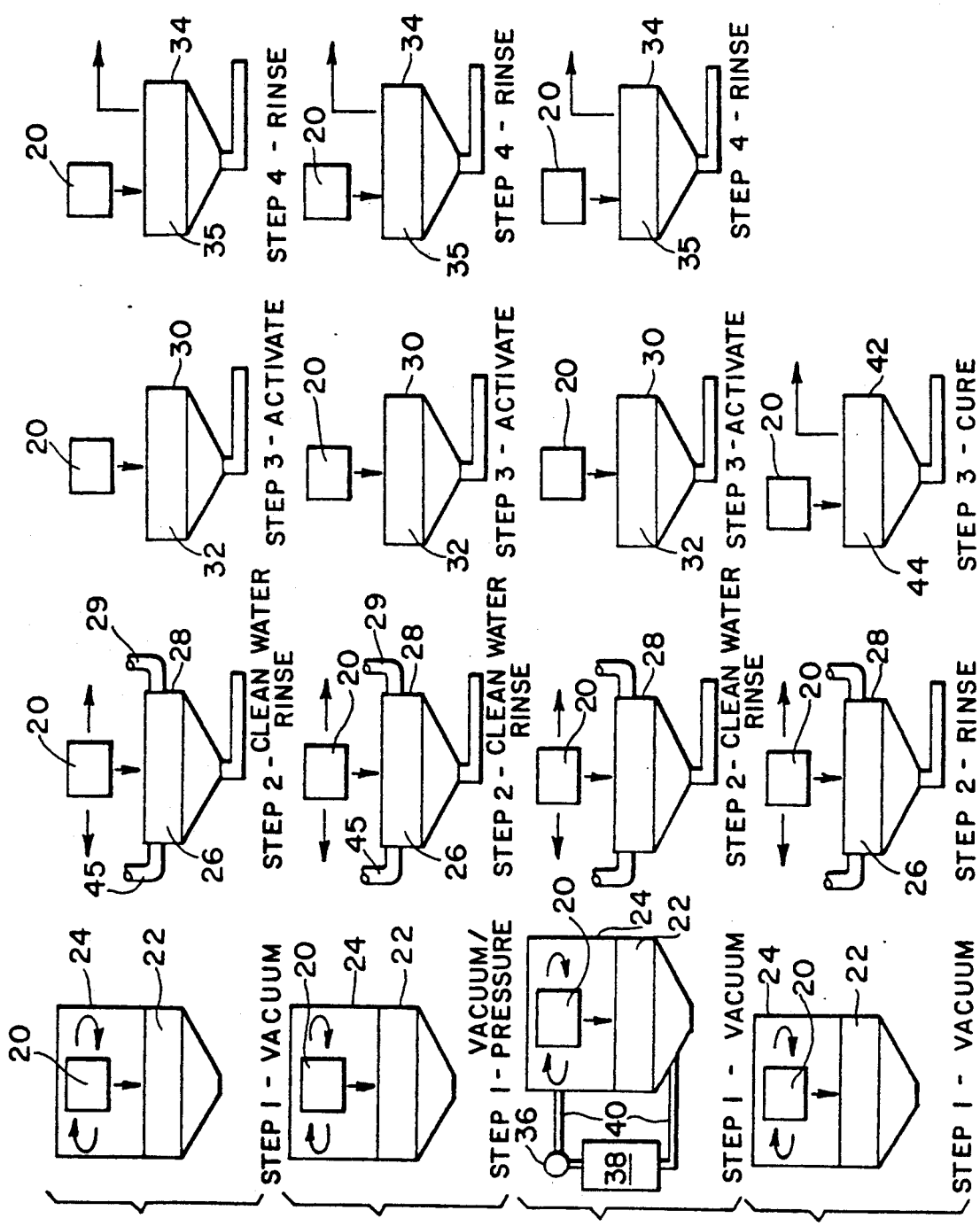
FIGS. 1A, 1B, 1C, and 1D each illustrates a prior art process for impregnation sealing of microporous articles.

Most impregnation sealing applications can be successfully achieved with the wet vacuum process illustrated in FIG. 1A. As diagrammatically illustrated, a single article 20 to be impregnated, or more commonly a basket of such articles, is submerged in step 1 into appropriate resin 22 contained within a suitable vacuum tank 24. The resin may be any one of a number of chemical compositions in the form of monomers or monomer systems which are usually anaerobically curable but which may be otherwise curable, as by the application of heat. Thus, the impregnant composition of the invention as more specifically disclosed and claimed in the previously mentioned related application comprises acrylate monomer and anaerobic or heat cure initiator for curing the monomer upon exclusion of oxygen and/or heating of the monomer, by free-radical polymerization. In those instances in which the resin is anaerobically cured, it is desirable to aerate the tank 24 so as to deter polymerization. A 10-12 minute vacuum cycle removes air from the resin and porosity of the article 20. Thereafter, when the tank 24 is returned to ambient pressure, the resin penetrates into the porosity of the article. In a known manner, the article 20 is raised above the level of the resin and then spun briefly within the tank 24 to allow centrifugal force to eliminate excess resin 22 on the surfaces of the article 20. Even after such removal of surface accumulations of the resin, there is a significant amount of resin at the surface of the porous articles, particularly in the vicinity of the pores.

When the resin is subsequently cured, the aforementioned surface accumulations remain in place, but in a hardened condition. Such residual surface amounts of polymerized resin are undesirable since they can contaminate the environment of the porous article upon removal by normal abrasion or in contact with various liquids. In addition, such surface accumulations can have a detrimental effect on articles which are subject to close tolerances. Thus, additional steps of grinding, or the like, for removal of the accumulations and return to desired dimensions would be in order along with the resulting expense for labor and loss of time to effect the correction. Also, this residual surface resin tends to interfere with the subsequent painting, plating, or assembly operations which frequently are performed on the porous articles subsequent to their impregnation, and such residual surface amounts of resin, again, must be removed prior to painting or plating operations and may contaminate any painting or plating baths which are used. Similar undesirable residual surface accumulations of resin can occur when the acrylate monomer is heat-cured and are similarly undesirable since they may similarly interfere with tolerance requirements and with subsequent painting or plating operations, or result in delamination of applied paint or plated films.

Based on the desirability of removing residual surface accumulations of the resin after the impregnation step (such residual surface accumulations are herein termed "excess" resin), it is conventional practice to subject the porous parts subsequent to their impregnation to an aqueous washing step, or "water rinse." The washing step removes the excess resin, and the washed porous articles from which excess resin has been removed are then transferred to subsequent treatment steps, such as activation (immersion of the impregnated articles in an activator solution), heating, final rinsing, drying, application of rust inhibitor, and the like.

Thus, the article 20 is then removed from the tank 24 and, in step 2, is submerged in clean rinse water 26 contained within a first rinse vessel 28 for a cycle time period of one to two minutes. The rinse water in the vessel 28 is continuously replenished as by water overflow schematically shown by an inlet 29. This serves to replace water lost by displacement when a large article is being dipped as well as to dilute the excess resin which accumulates therein to allow for effective washing. With the article 20 submerged in the rinse water 26, it may be suitably oscillated so as to remove any remaining resin 22 from the external surfaces of the article 20 or trapped in blind holes.

Thereupon, the article 20 is removed from the first rinse vessel 28 and brought to an activator vessel 30 for step 3. For this step, the vessel 30 contains a solution 32 of water and a catalyst activator for curing the resin at the entrance to each pore. This creates a hardened plug or cap in the outer portion of the pore, trapping the remaining resin for anaerobic self-cure in a known manner.

Following completion of step 3, the article 20 is removed from the vessel 30 and delivered to a second rinse vessel 34. In step 4, the article is submerged in clean rinse water 35 within the vessel 34 in order to remove the activator solution from the article and warm it for quick drying. It is common practice for the rinse water 35 to include a rust or corrosion inhibitor as well. The rinse water 35 may be at room temperature in which event the resin will cure in two to three hours or at an elevated temperature, for example, 120° F., in which event full cure will occur within 30 minutes. At the conclusion of step 4, the impregnation sealing process has been substantially completed and the article 20 is removed from the system.

Turn now to FIG. 1B which depicts a wet vacuum/pressure impregnation sealing process which is used for articles exhibiting very fine porosity, such as powdered metal with a density greater than 7.0 gm/cc. Step 1 of the process depicted in FIG. 1B is generally similar to step 1 depicted in FIG. 1A with the exception that at the end of the vacuum cycle, the tank 24 is pressurized briefly to assist and/or promote the movement of the resin into small porosity passages within the article 20. Thereafter, the article 20 is spun briefly in the manner already described with respect to FIG. 1A. Steps 2, 3, and 4 in the FIG. 1B process are all similar to those described with respect to the FIG. 1A process.

FIG. 1C depicts an impregnation sealing process used for critical applications when porosity is small and maximum sealing must be achieved. In step 1 of this process, an article is placed directly in the vacuum tank 24, after which air is evacuated for approximately 10 minutes. As in the previously described steps 1, the purpose is to remove air from the porosity of the article. Thereafter, a transfer valve 36 is opened allowing resin which is also subject to the same vacuum to enter the tank 24 from a storage tank 38 via pipe 40. As in step 1 of the process depicted in FIG. 1B, the tank 24 is automatically pressurized to force resin into the article 20. Thereafter, the resin is returned to the reservoir 38 via the pipe 40 and the article is spun to remove excess surface resin. Steps 2, 3, and 4 of the process depicted in FIG. 1C are similar to those previously described with respect to the processes of FIGS. 1A and 1B.

FIG. 1D depicts a process which is typically employed when the impregnation operation is to be used with a heat curable impregnation resin. Steps 1 and 2 are similar to those numbered steps described with respect to the FIG. 1A process. In step 3, a curing vessel 42 contains hot water 44, typically at a temperature of 195° F., which serves to cure the resin in approximately 20 minutes. Thereafter, the sealed article is removed from the system to accommodate the introduction of successive articles to be sealed.

The foregoing processes are briefly described in pages 10-12 of a 16 page brochure entitled: "Introducing L. I. S. Loctite Impregnation Systems", Copyright 1985 by Loctite Corporation.

The invention is primarily concerned with purifying the rinse water 26 utilized in step 2 of any of the above described processes. However, it is not intended that the invention be limited merely to operating on rinse water resulting from those steps 2, but is broad enough to purify the aqueous solutions in any of the steps 3 or 4 of any of the processes. In fact, the invention is applicable to any process in which there is a resulting water and emulsion composition and it is desired to remove the emulsion and thereby purify the water.

The aqueous washing for removal of excess resin from the impregnated porous articles results in the formation of an acrylate emulsion-containing rinse water. The acrylate emulsion, being organic and substantially insoluble in the aqueous wash medium, results in the formation of a disperson or emulsion in the wash water. As previously noted, the aqueous washing medium is typically aerated by an air sparger or otherwise agitated to maximize washing efficiency, so that the acrylate emulsion becomes finely dispersed in the aqueous wash medium. Further, it has become conventional practice to utilize in the aqueous medium, and/or the resin composition, surfactant materials which facilitate the water wash removal of excess impregnant. The use of surfactants and specific surfactant materials utilized for such purpose are more fully described in U.S. Pat. No. 3,969,552, and U.S. Reissue Pat. No. 32,240, the disclosures of which are hereby incorporated by reference herein. The use of such surfactants in the rinse medium and/or impregnant composition, results in the formation of an emulsion of the impregnant in the rinse water.

A specific feature of the impregnant composition used for the system of the present invention, and more fully disclosed in the aforesaid related application, is the incorporation therein of a suitable non-peroxy photoinitiator, which is curingly effective for the acrylate emulsion, to initiate polymerization thereof under actinic radiation exposure conditions.

The photoinitiator employed to effect polymerization of the acrylate emulsion content of the aqueous washing effluent waste water may comprise any suitable photoinitiator which is effective to induce polymerization of the emulsion under appropriate actinic radiation exposure conditions. It may be present with the impregnation sealing resin within the tank 24, or it may be separately introduced to the rinse vessel 28 as via an inlet 45. As a further alternative, it may be introduced to the rinse water effluent as it is withdrawn from the rinse vessel 28, or at some other location or in some other manner prior to actinic radiation exposure.

As a result of this incorporation of photoinitiator, the waste water from the aqueous washing excess impregnant removal step may be treated by subjecting the waste water to actinic radiation exposure conditions causing polymerization of the acrylate emulsion in the waste water deriving from the removed excess impregnant. Under such actinic radiation exposure conditions, polymerization of the emulsion is effected to deplete the waste water in acrylate monomer content, and produce a polymer-containing waste water, from which the polymer may be recovered to yield a final waste water effluent of reduced monomer and polymer content, which may then be discharged to receiving waters.

A preferred mode of recovering the polymer from the actinic radiation-treated waste water effluent will now be described. Turn now to FIG. 2 which diagrammatically illustrates a system 46 for purifying the rinse water effluent. In accordance with the invention, contaminated rinse water 48 is illustrated contained within the first rinse vessel 28 which is utilized in step 2 of each of the processes described above with respect to FIGS. 1A-1D.

In a manner to be described, according to the invention, the rinse water 48 is continuously passed through a curing subsystem 50 for exposing the emulsion present in the contaminated rinse water 48 to UV energy to thereby cause it to polymerize. After exiting the curing subsystem 50, the UV treated water is then passed through a filter mechanism 52 after which it is either discharged, re-filtered, or returned to the rinse vessel 28. The system 46 is therefore operative to purify the rinse water 48 of UV polymerizable monomer or monomer systems which are present in the water.

A delivery system for drawing the contaminated rinse water 48 to the curing station 50 includes a suitable delivery conduit 54 and an associated pump 56 adequate for the purpose. Of course, it will be recognized that the system 46 could rely on gravity feed alone to deliver the water 48 to the curing station 50. At the same time, a suitable skimmer 58 operatively associated with the vessel 28 may be employed to remove to a waste cannister 59 any organic and/or inorganic, relatively large, solid contamination which is present on the surface of the water 48. For this purpose, the cannister 59 may be provided with a suitable filtering screen 60 to receive the contamination. Preferably, the screen 60 is removable to enable periodic disposal of the contamination thereby intercepted before traveling farther downstream. A conduit 61 allows the waste water 48 cleansed of the solid contamination to join the remainder of the waste water 48 flowing in the conduit 54 to the curing subsystem 50. It may also be desirable to introduce to the system, prior to curing, as suitable agglomerating material for further coalescing the dispersion of the emulsion and/or polymer, as via a conduit 55. The conduit 55 communicates with the conduit 54 at a location upstream of the curing subsystem 50.

Figure 2:
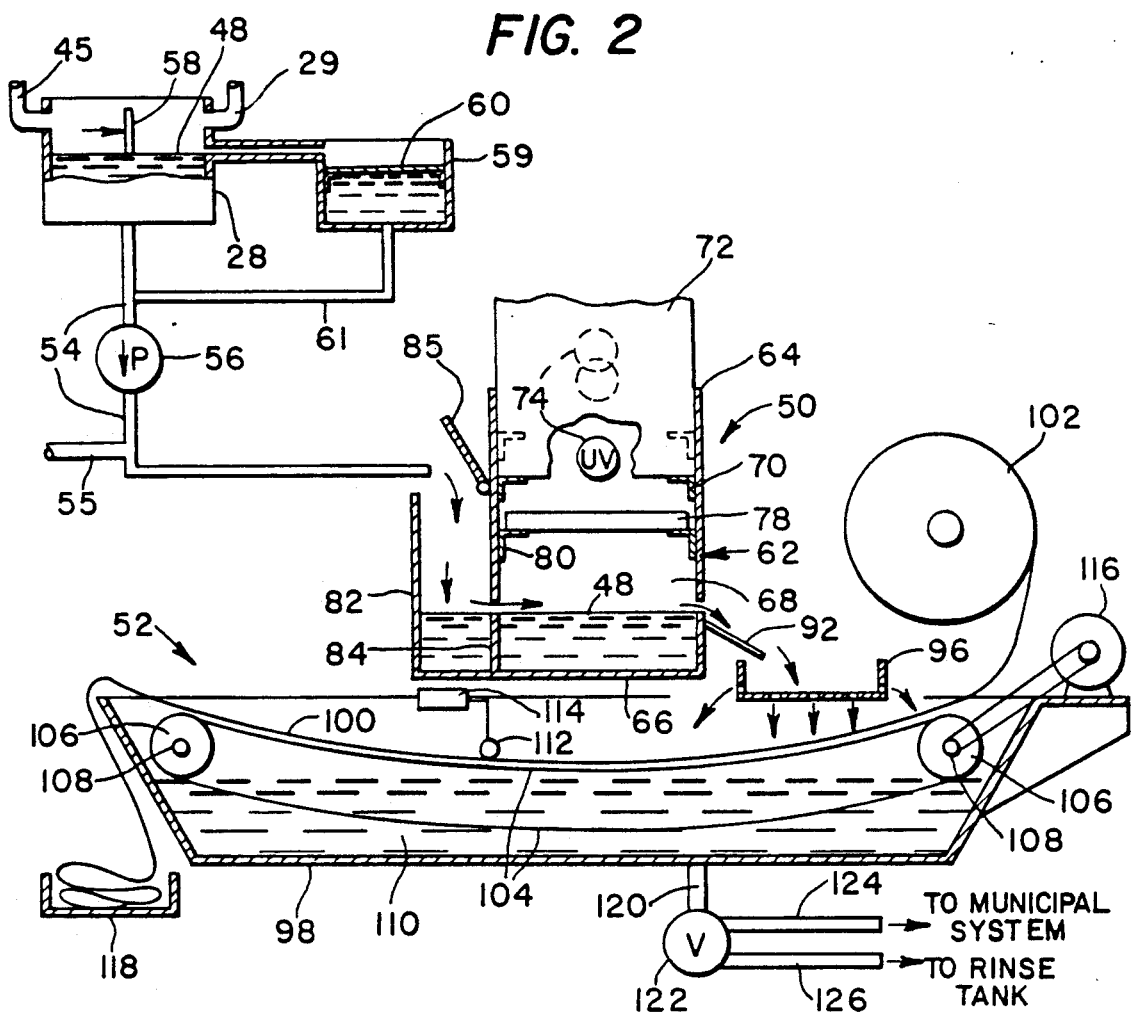
FIG. 2 is a diagrammatic view of one embodiment of the invention which serves to purify rinse water from any of the processes illustrated in FIGS. 1A-1D in which the rinse water contains an ultraviolet polymerizable monomer or monomer system.
Figure 3:
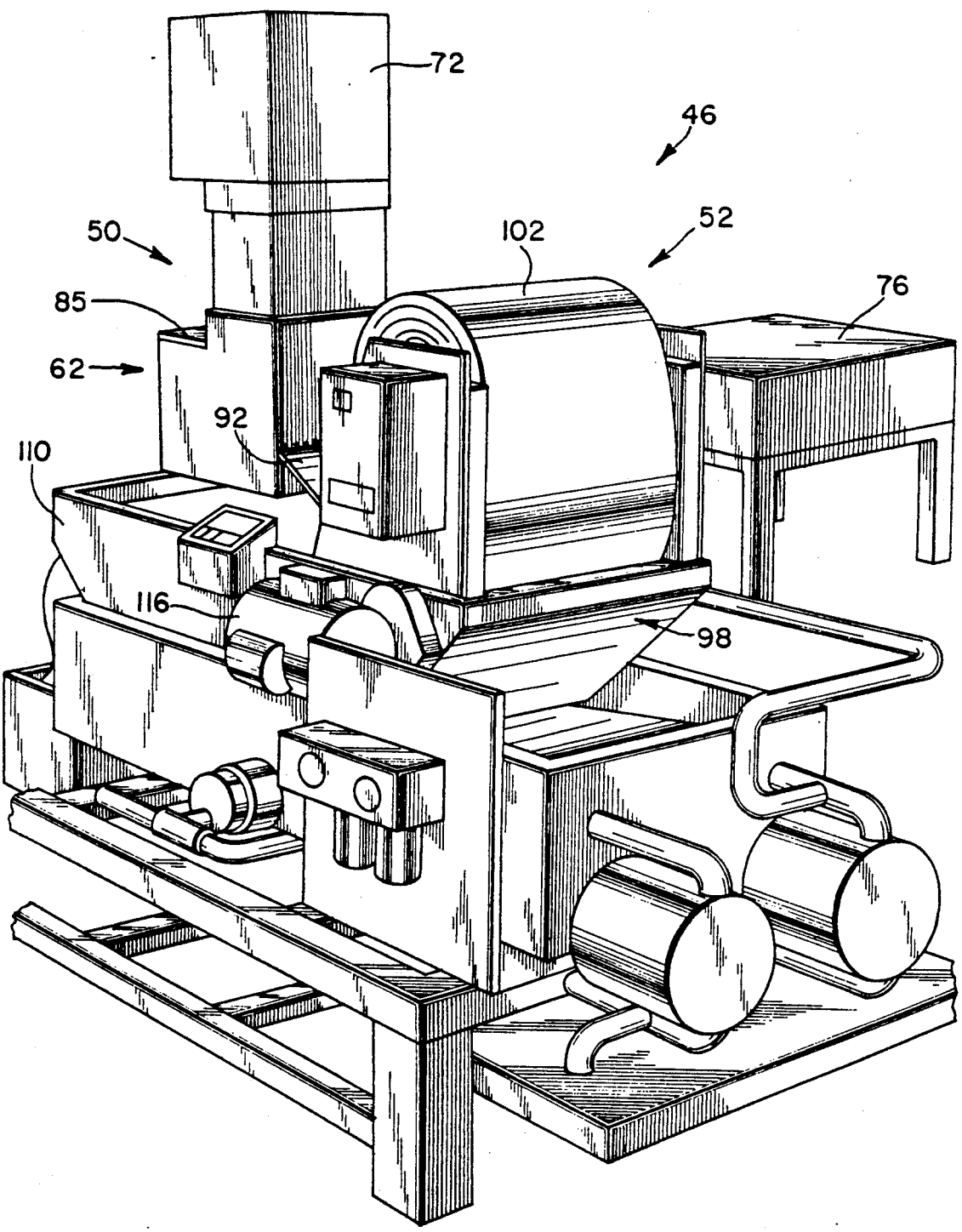
FIG. 3 is a perspective view illustrating the actual system of the invention used for purifying rinse water which is diagrammatically illustrated in FIG. 2.
Figure 4:
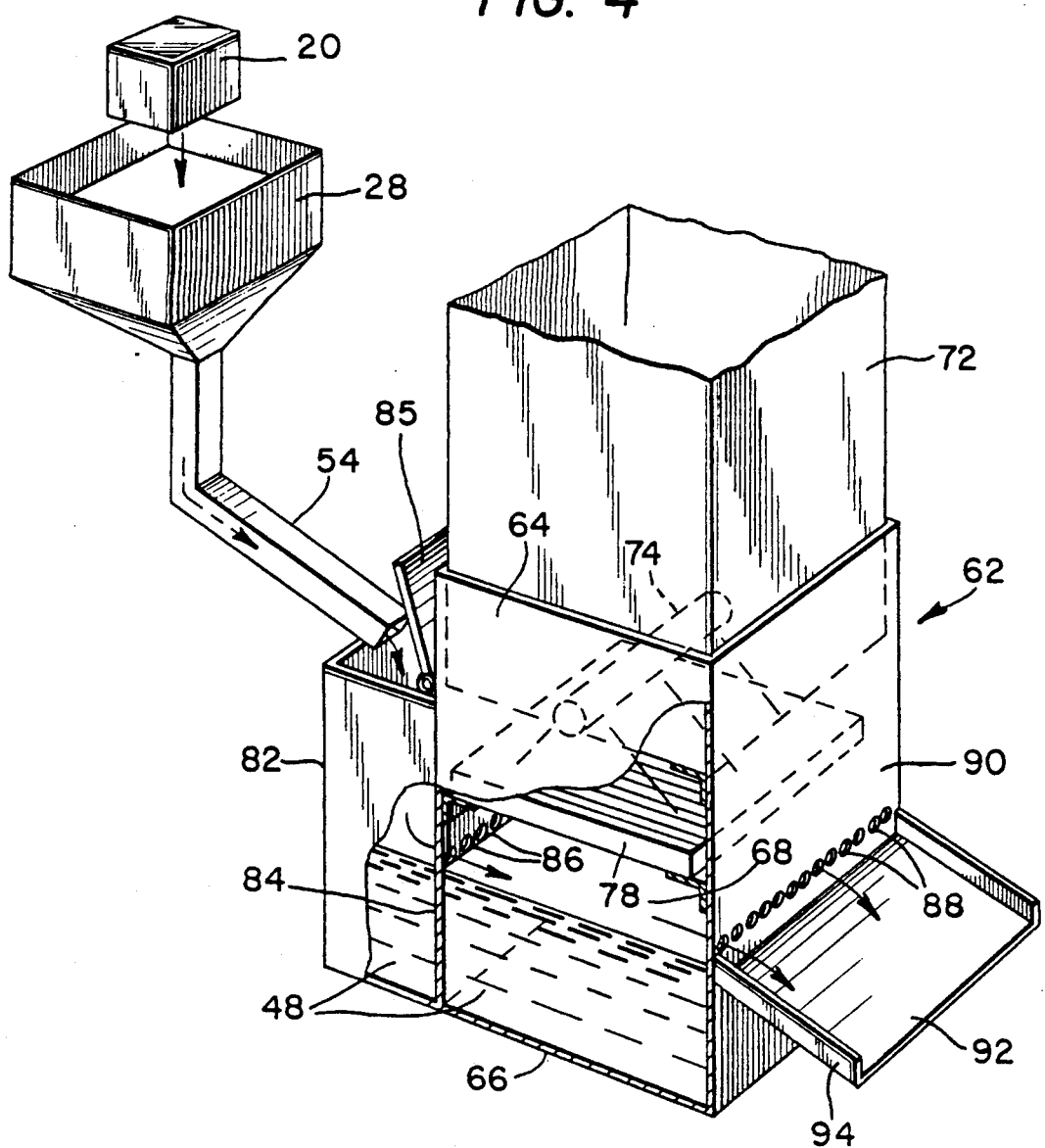
FIG. 4 is a detail perspective view, certain parts being cut away and shown in section, of components illustrated in FIG. 2.

Turn now to FIGS. 2-4 for a detailed description of the curing subsystem 50. It comprises an enclosure 62 having an upper end 64 and a bottom 66, respectively, including a water tight irradiation chamber 68 at its lower end for containing the contaminated rinse water 48, that is, the water and emulsion combination. The rinse water 48 reaches, then does not exceed, a predetermined level in a manner to be described. A plurality of brackets 70 are suitably mounted to the interior wall of the enclosure 62 and lie generally in a plane parallel to and spaced above the predetermined level of the contaminated water 48. The brackets 70 serve to support a self-contained source of UV energy 72 such as the Model F450 Lamp System manufactured by Fusion UV Curing Systems, a subsidiary of Fusion Systems Corporation of Rockville, Md. The source 72 includes an integral electrodeless bulb, with an integral focused elliptical reflector, collectively referred to herein as lamp 74, and is energized by an associated power supply 76 (FIG. 3).

As indicated in FIG. 2, the brackets 70 may be made adjustable in order to adjust the distance between the UV source 72 and the upper level of the rinse water 48 to thereby adjust the intensity of the radiation to which the water is exposed. In all relative positions between the UV source 72 and the rinse water 48, the lamp 74, which is elongated and has a longitudinal axis, lies in a plane which is generally parallel to the predetermined level of the rinse water 48. In order to prevent the water 48 from splashing the UV source 72, a guard member 78 is positioned above the surface of the rinse water and beneath the source 72. The guard member is of any suitable material capable of transmitting UV radiation. It may, for example, be composed of quartz glass sheet material, although numerous other substances and designs could be used. As in the instance of the source 72, a plurality of lower brackets 80 can be attached to the interior of the enclosure 72 to support the guard member 78, preferably in a plane which is parallel to the plane of the lamp 74 and the surface of the rinse water 48.

As the rinse water 48 travels to the irradiation chamber 68 via the delivery conduit 54, it is first received in a reservoir 82 which is part of the enclosure 62, but separated from the chamber 68 by a wall 84. The rinse water is delivered through a suitable opening at its upper regions normally covered by a cap or lid 85 but hinged for opening as necessary. A plurality of openings 86 (see especially FIG. 4) are formed in the wall 84 and lie in a plane parallel to, and a defined distance above, the bottom 66. The openings 86 are commonly sized and enable continuous flow of the rinse water 48, without splashing, from the reservoir 82 into the irradiation chamber 68. The openings 86 and the bottom 66 (FIG. 2) or floor 132 (FIGS. 2A and 2B) thereby define the depth of the rinse water 48 within the chamber 68.

Flow of the rinse water 48 across the chamber 68 is made possible by a similar plurality of side-by-side, commonly sized, openings 88 formed in a wall 90 of the enclosure 62 opposite the wall 84. The openings 88 are coplanar with the openings 86 and direct flow onto a trough 92 mounted to the exterior of the enclosure 62. The trough is slanted in a downward direction and has opposed upturned edges 94 for directing flow of the rinse water 48 into the filter mechanism 52. A splash pan 96, suitably apertured, may be interposed between the trough 92 and the filter mechanism 52 so as to effectively disperse the liquid, that is, the water with polymer suspended therein, across a broad surface and not in a defined stream as it descends onto the filter subsystem 52.

Figure 2A:
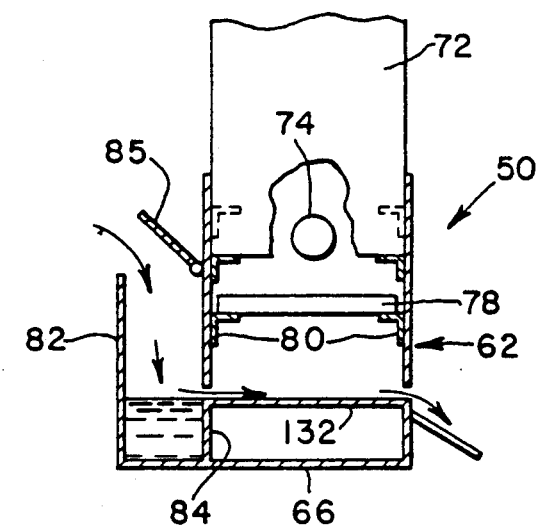
FIG. 2A is a detail elevation view, certain parts being cut away and shown in section illustrating parts modified from FIG. 2.
Figure 2B:
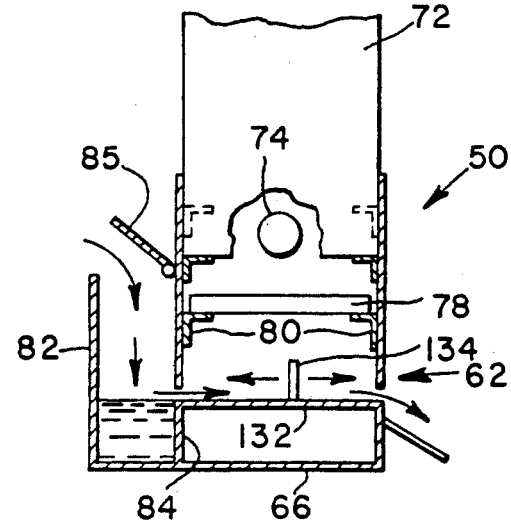
FIG. 2B is a view, similar to FIG. 2A, illustrating yet another embodiment of the invention.

While it has been disclosed that the rinse water 48 in chamber 68 has substantial depth, that is, the distance between the bottom 66 and the respective openings 86 and 88, it is preferably very small. Generally, the depth is no greater than about 3 inches and is preferably less than one inch. Indeed, as illustrated in FIG. 2A, there may be a false bottom or floor 132 substantially reducing the depth of the rinse water 48, even to the extent that it is little more than a film flowing across the surface thereof. The film would be generally less than one inch and preferably between one-quarter and one-half an inch in depth. The modified construction illustrated in FIG. 2A can be further modified as illustrated in FIG. 2B. Specifically, it may be desirable to provide a wiper 134 suitable for skimming the floor 132 as the water and emulsion combination flow thereacross for the purpose of removing any organic and/or inorganic contamination which may be present thereon.

It is noteworthy that the time of exposure of the rinse water to UV radiation within the irradiation chamber 68 is generally less than five minutes, indeed, usually less than one minute. The exposure time is measured from the time a unit volume of the rinse water enters the irradiation chamber through the openings 86 until the time that the same unit volume exits the irradiation chamber through the openings 88.

With continued reference to FIGS. 2 and 3, the filter subsystem 52 includes a catch basin 98 adapted to receive filtered water after it has passed by gravity through filter media 100 which is stretched both width wise and length wise across the upper opening into the basin. The filter susbsystem, about to be described, may be in the nature of the Automatic Gravity Filtration System manufactured by Serfilco, Ltd. of Glenview Ill. However, it will be understood that other suitable filter systems may be employed other than the one specifically described and illustrated. The filter media 100 may be a fabric composed of any one of a variety of materials and having a wide range of porosity, for example, nylon, rayon, or cellulose, down to 0.1 micron size, or even smaller, pores. The filter media 100 is drawn from a supply roll 102 onto a continuous belt 104 which is engaged by pulleys 106 supported on axles 108, respectively, which extend across the basin 98 for mounting at their opposite ends in side walls 110. The belt 104 is generally slung between the pulleys 106 and the filter media 100 follows the contour of the belt 104 as it extends between the side walls 100.

As the rinse water containing the polymer flows from the splash pan 96 onto the filter media 100, it is diffused across the bed of the filter media within the basin 98 and separation of the polymer from the water is caused by gravity flow through the media and into the basin 98. The solid polymer is collected by the filter media 100 until the pores are closed off, thereby trapping liquid upon the upper surface of the media and raising the level of the liquid thereon. A float 112 positioned above the belt 104 and lightly engaging the filter media 100 serves to actuate a switch 114 as the trapped liquid rises to a predetermined level. The switch, in turn, operates a motor 116 to drive the right hand pulley 106.

Preferably, the operation is a stepped one such that the entire section of the filter media extending between the pulleys 106, when substantially spent, is withdrawn into a waste receptacle 118, eventually to be discarded. Of course, as a spent section of the filter media is deposited into the receptacle 118, a fresh section is being drawn from the supply roll 102. Thereupon the motor 116 ceases operation until activated once again by the switch 114. The purified water contained in the basin 98 beneath the filter media 100 exits through a drain 120 and, by means of a suitable combined pump/valve 122, can be returned via a conduit 124 to the municipal water system or otherwise disposed of without any concern of adversely affecting the environment. In the alternative, the purified water can be directed to pass through a conduit 126 to return it to the rinse tank 28 for reuse in the coating process.

Figure 5:
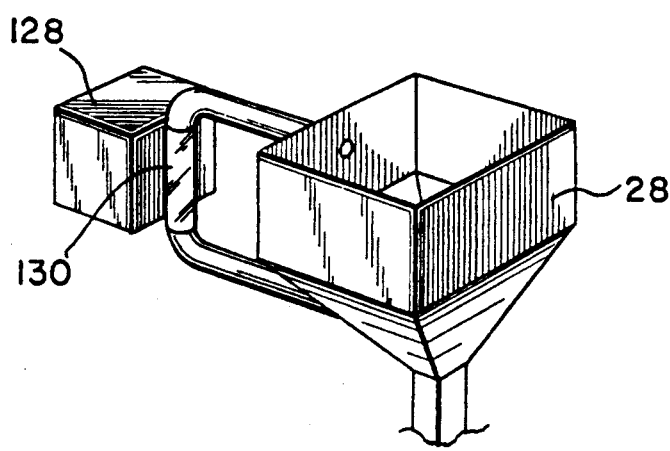
FIG. 5 is a detail perspective view illustrating a modification of the invention.

After the purified water has been drained from the basin 98, it is desirable to determine what amount of polymer still remains in the water after filtration, if any detectable amount should still remain. It is noteworthy that the nominal size of the polymer resulting from the resin which has been mentioned is exceedingly small, having diameters generally in the micron and sub micron range. Because of the small size of the polymer contamination, it may not be possible to capture all of it in one pass through the filter subsystem 52. Success would depend upon the sophictication of the filter subsystem 52. Thus, as seen in FIG. 5, in the event the purified water is returned to the rinse vessel 28, a spectrophotometer 128 can be used in a known manner to view the purified rinse water through a suitable sight glass 130. In the event the clarity of the water does not meet with acceptable standards, it may be desirable to repeat the process just described, possibly more than one additional time, to assure that the end product will meet the established requirements.

Of course, it will be understood that an arrangement such as illustrated in FIG. 5 may be employed without requiring the return of the purified rinse water all the way to the rinse vessel 28. In other words, it may desirable, and would be preferred, for example, to determine clarity of the water as soon as possible after it issues through the drain 120 and such detection may be performed on a continuous basis. Such continuous monitoring would determine whether to re-cycle the purified water through the filter subsystem 52 or to direct it to an ultra filtration or "polishing" filter system if it becomes apparent that normal filtration is not being effective to remove the residual contamination. A polishing filter system which could be utilized for purposes of the invention is described below. When the clarity of the water reaches an acceptable level, it can then be discharged in any proper manner, including to a municipal water system.

It was previously mentioned that the monomer system used for sealing the articles 20 may be comprised of acrylate monomer and anaerobic or heat cure initiator plus a suitable photoinitiator to cause the generation of radicals to initiate polymerization upon exposure to UV energy. One suitable photoinitiator is known as diethoxyacetophenone or "DEAP" and is manufactured by the Fine Chemical Division of The UpJohn Company, of North Haven, Conn. DEAP has been used successfully with the acrylate monomer of the sealant composition. Additionally, a Type "D" UV bulb manufactured by Fusion UV Curing Systems, a subsidiary of Fusion Systems Corporation of Rockville, Md. has also been found to work satisfactorily with both the monomer and the photoinitiator, DEAP. The Type "D" bulb and its associated reflector is representative of the lamp 74 which can be used with the curing subsystem 50.

Many other matched combinations of acrylate monomer, anaerobic or heat cure initiator, and photoinitiator and UV sources are possible, the foregoing merely being provided for purposes of illustration. Simple laboratory testing will determine the optimum photoinitiator to use with a particular monomer, and then the proper light source to use with that particular composition.

Figure 6:
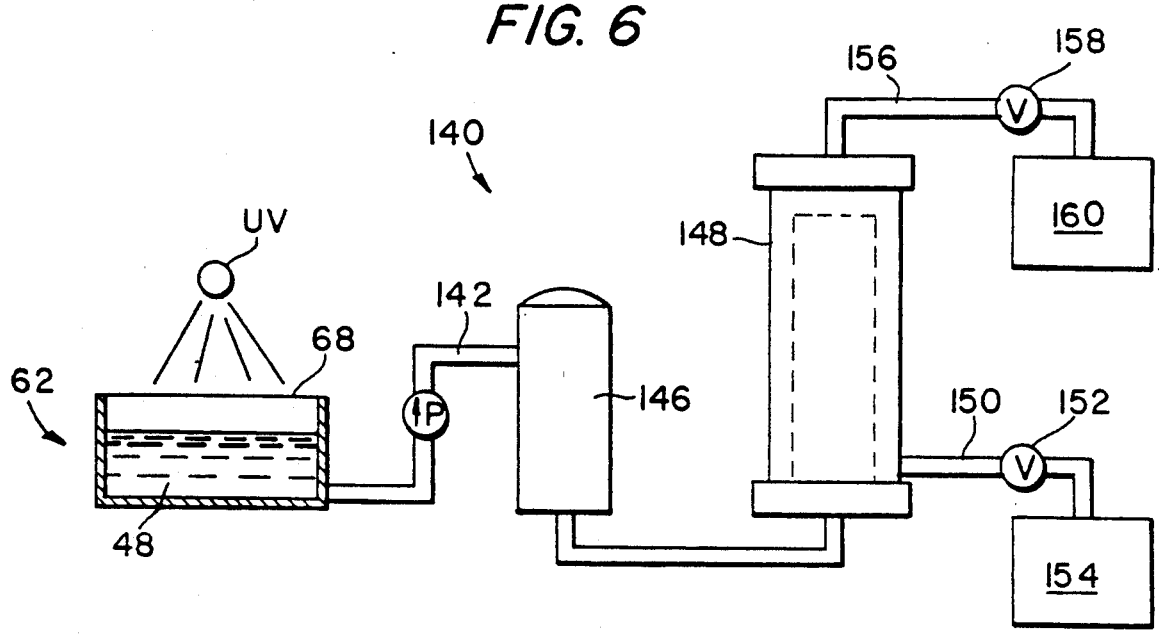
FIG. 6 is a diagrammatic representation of a modified filtration subsystem which may be employed for purposes of the invention.

Although the substantially horizontal, or gravity activated, filter subsystem 52 serves its intended purpose well, other filter subsystem designs may also be employed by the system 46 and may even be preferred for specialized operations. A generally vertically disposed filter subsystem 140 is illustrated in FIG. 6. The enclosure 62 and its associated UV lamp 74 are diagrammatically depicted and are intended to have substantially the same construction as previously described. However, in this instance, the rinse water 48, after being exposed to UV radiation in the manner previously described, is drawn from the irradiation chamber 68 through a conduit 142 by means of a pump 144 to a prefilter 146 and thereafter into a coalescing chamber 148 having suitable filter media therein. In the coalescing chamber 148, the heavier polymer settles to the bottom and is drawn off via a conduit 150 and associated valve 152 to a suitable waste container 154. The lighter, purified water may be drawn off via a conduit 156 and valve 158 to a suitable storage container 160. Subsequently, as in the instance of the FIG. 2 embodiment, the purified water may be returned to the public water system or otherwise disposed of, or may be returned to the rinse tank 28. The filter subsystem 140 may be of a design referred to as a separation coalescer which is manufactured and sold by Serfilco, Ltd. of Glenview, Ill. The coalescing chamber 148 may be, for example, a "SERFILCO" brand Model No. AUV420K, CUV620K, or CV620KS.

Figure 7:
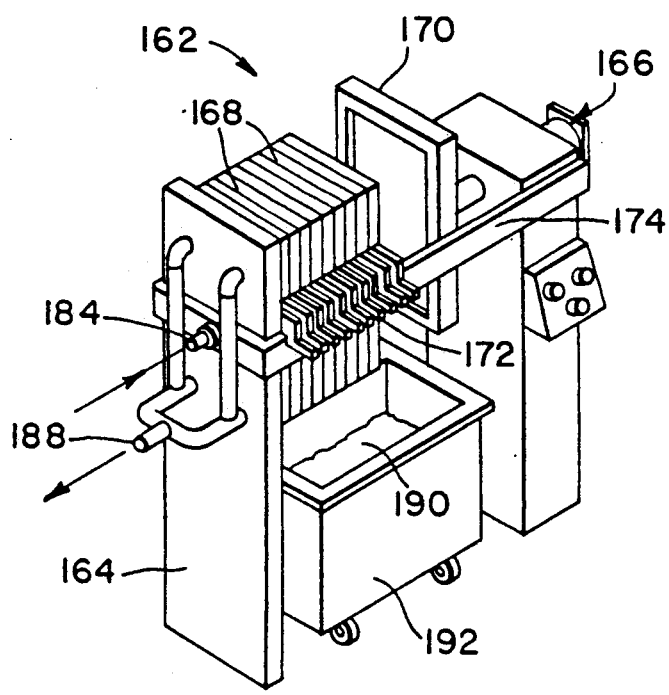
FIG. 7 is a perspective view of another modified filtration subsystem which may be employed for purposes of the invention.
Figure 9:
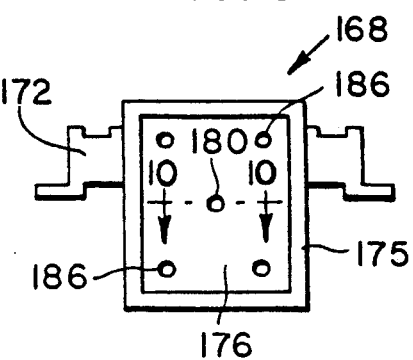
FIG. 9 is a detail front elevation view of a component of the subsystem illustrated in FIGS. 9 and 8.
Figure 10:
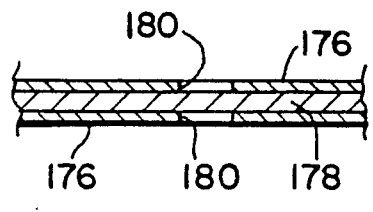
FIG. 10 is a detail cross section view taken generally along line 10—10 in FIG. 9.
Figure 8:
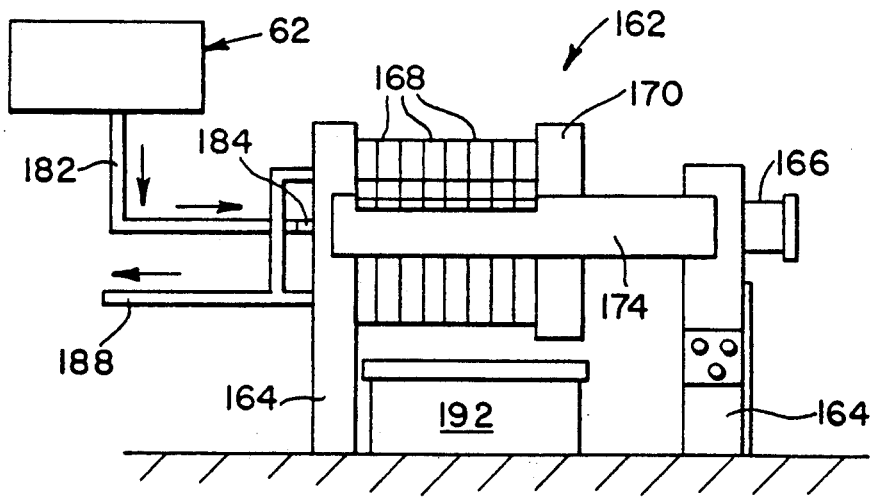
FIG. 8 is a side elevation view, partly diagrammatic, of the subsystem illustrated in FIG. 7.

Another filter subsystem suitable for use with the invention is illustrated in FIGS. 7, 8, and 9 and is generally referred to by the reference numeral 162. The filter subsystem 162 may be of a design also manufactured and sold by Serfilco, Ltd., of Glenview Ill., and is sometimes referred to as a polishing filter system as briefly mentioned above. That is, it utilizes a series of very fine filtering media and therefore is capable of more efficient removal of particulate matter than a single-pass filtration system. The filter subsystem 162 comprises a frame 164 with a hydraulic mechanism 166 suitable for selectively clamping or releasing a plurality of filter plates 168 (see especially FIG. 9). When clamped, they are in face to face relationship (FIG. 8), held there by a vise element 170. Each filter plate 168 includes opposed arms 172 which are slidably received on tracks 174. Each filter plate 168 also includes a frame 175 which supports peripherally a sandwich of two supporting sheets 176 of metal or other suitable stiff sheet material with suitable filter media 178 supported between them. The filter media 178 may be generally of the material and construction mentioned above with respect to the media 100. The metal sheets 176 have a plurality of generally aligned holes 180 therein allowing flow from one end of the subsystem to the other and back again.

Specifically, the water and polymer mixture from the enclosure 62 is delivered to the filter subsystem 162 via a conduit 182 (FIG. 8), through a fitting 184 (FIG. 7) in the frame 164, thence through all of the centrally disposed holes 180 in each of the successive filter plates 168. At the vise element 170, the water is caused to reverse its travel and return via a plurality of outer holes 186 and the filtered water eventually exits via a conduit 188. After a proper time period, the flow of water is terminated and the hydraulic mechanism 166 operated to move the vise element 170 to the open position (FIG. 7), thereby allowing the filter plates 168 to discharge the polymer 190, a solid material, into the bin 192. The solid polymer 190 is an inert material which can be readily disposed of without harm to the environment.

Figure 11:
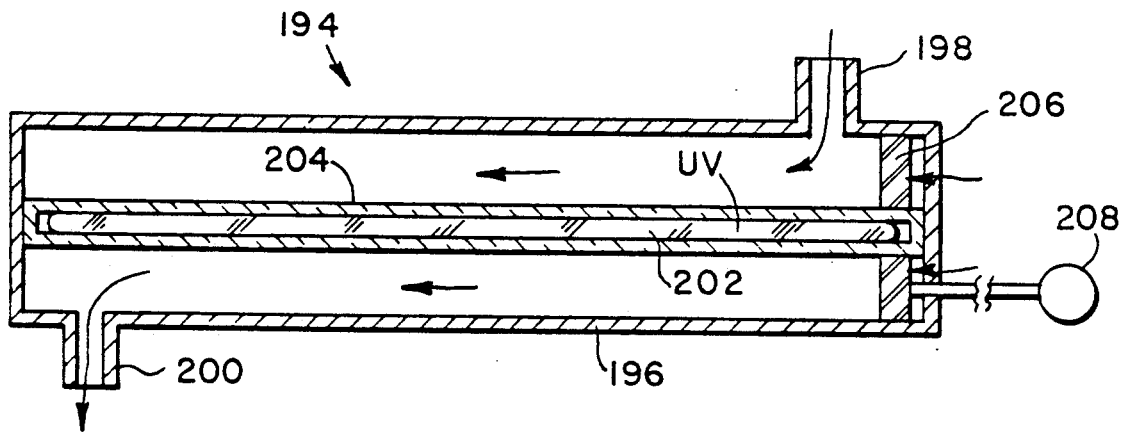
FIG. 11 is a longitudinal cross section view of a modified curing subsystem adapted for use by the invention.
Figure 12:
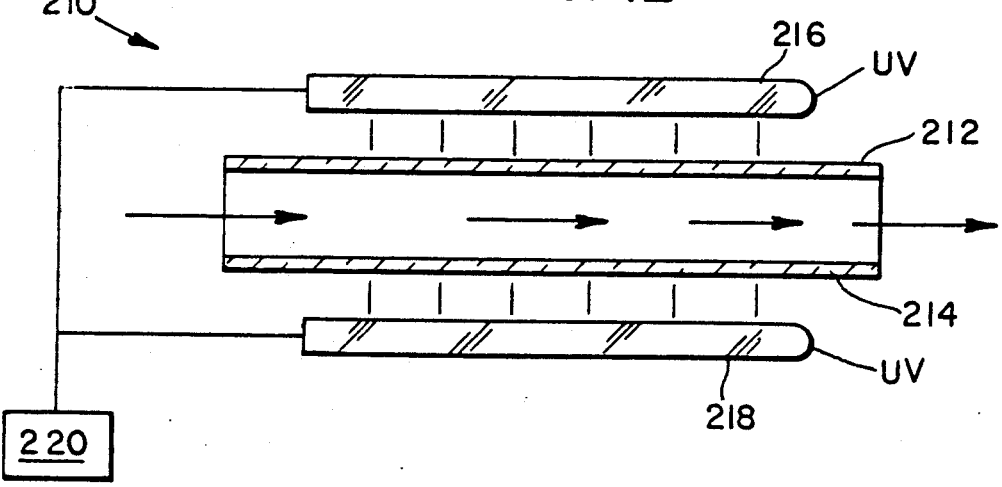
FIG. 12 is a diagrammatic view of still another curing subsystem adapted for use by the invention.

Alternative curing subsystems, different from the subsystem 50, are illustrated in FIGS. 11 and 12.

The curing subsystem 194 illustrated in FIG. 11 may be, for example, any of several models of UV water purifiers manufactured and sold by Ultra Dynamics Corporation of Santa Monica, Calif. The curing subsystem 194 includes a cylindrical outer casing 196 which is provided with an inlet 198 for receiving the rinse water and an outlet 200 from which the rinse water, after irradiation, is discharged. An UV lamp 202, which may be similar to the lamp 74, is protectively mounted within a cylindrical jacket 204 composed of quartz or other suitable material capable of transmitting UV radiation. A doughnut shaped wiper 206 is engaged with the inner surface of the outer casing 196 and, similarly, with the outer surface of the jacket 204. A handle 208, external of the casing 196, is manually operable to reciprocably move the wiper 206 longitudinally of the casing so as to periodically clean the interior surfaces of polymer which may have formed thereon. Thus, as the emulsion-containing rinse water passes through the casing 196, it is irradiated by means of the lamp 202 such that the water being discharged from the outlet 200 carries the polymer with it and no longer the impregnant in the form of an emulsion.

FIG. 12 illustrates yet another curing subsystem, indicated by reference numeral 210, which may utilized by the invention. In this instance, the rinse water to be purified is directed between opposed parallel plates 212, 214 composed of quartz or other suitable material capable of transmitting UV energy. Behind and generally parallel to each plate 212, 214 is an associated UV radiation generating lamp 216, 218, each of which may be similar to the lamp 74. Each lamp 216, 218 is energized by a suitable power source 220. As seen in FIG. 12, the rinse water flows from the left hand side between the plates 212, 214 where it is exposed to UV radiation from the lamps 216, 218, then exits from the right hand side of the plates 212, 214 after which it is caused to flow to a suitable filter subsystem in a manner as previously explained.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Apparatus for purifying, in a continuous operation, rinse water containing a monomer emulsion of the anaerobic or heat cure variety plus a photoinitiator to cause the generation of radicals to initiate polymerization upon exposure to UV energy comprising:
   curing means proximate to but spaced from the rinse water for exposing the rinse water containing the monomer emulsion to UV energy to cause the emulsion to polymerize;
   delivery means for directing uninterrupted flow of the rinse water containing the emulsion past and proximate to said curing means at a rate sufficient to substantially complete polymerization of the emulsion in the rinse water; and
   filter means positioned downstream of said curing means to receive from said curing means the irradiated rinse water containing the polymer, said filter means operable for removing the polymer from the rinse water.

2. Apparatus for purifying rinse water as set forth in claim 1 including:
   a rinse vessel for initially retaining the rinse water; and
   delivery means for drawing the rinse water containing the emulsion from said rinse vessel to a location adjacent said curing means for exposure thereof to UV energy.

3. Apparatus for purifying rinse water as set forth in claim 2 including:
   conduit means for returning the rinse water purified of the polymer to said rinse vessel.

4. Apparatus for purifying rinse water as set forth in claim 1 including:
   trough means for directing the rinse water with polymer therein to said filter means; and
   wherein said filter means includes:
   substantially horizontally disposed filter media positioned to receive the rinse water with polymer therein from said trough means; and
   reservoir means positioned beneath said filter media for receiving water therein cleansed of the polymer captured by said filter media.

5. Apparatus for purifying rinse water as set forth in claim 4 including:
   a rinse vessel for initially retaining the rinse water;
   delivery means for drawing the rinse water containing the emulsion from said rinse vessel to a location adjacent said curing means for exposure thereof to UV energy;
   conduit means including a valve selectively operable, in one instance, for returning the rinse water purified of the polymer to said rinse vessel and, in another instance, for returning the rinse water to said filter means; and
   sensing means downstream from said filter means for detecting the clarity of the rinse water purified of the polymer;
   said valve means being operable for directing the rinse water to said filter means in the event the clarity thereof is unacceptable and for directing the rinse water to said rinse vessel in the event the clarity thereof is acceptable.

6. Apparatus for purifying rinse water as set forth in claim 2 including:
   means for skimming the surface of the rinse water in the rinse vessel to thereby remove any organic and/or inorganic contamination present thereon.

7. Apparatus for purifying rinse water as set forth in claim 1 including:
   trough means for directing the rinse water with polymer therein to said filter means; and
   reservoir means positioned beneath said filter means for receiving water therein cleansed of the polymer captured by said filter means; and
   wherein said filter means includes:
   a source of filter media in the form of a continuous web having pores therein of a predetermined size;
   conveyor means for supporting said web drawn from said source in a substantially horizontal plane for a finite distance overlying said reservoir means, said web positioned to receive on its upper surface the rinse water with polymer therein from said trough means, said conveyor means being operable for withdrawing a spent section of said web from the position overlying said reservoir means to a distant location for
   disposal and simultaneously advancing a fresh section thereof into position overlying said reservoir means;
   sensing means for detecting the liquid level above said web as the pores therein are closed off by the captured polymer thereon; and
   drive means responsive to said sensing means when the liquid level above said filter media reaches a predetermined level for operating said conveyor means to withdraw the spent section for disposal and to advance the fresh section into position overlying said reservoir means.

8. Apparatus for purifying rinse water as set forth in claim 7 including:
   a splash pan intermediate said trough means and said web as it overlies said reservoir means to receive, then redeliver with maximum dispersal, the rinse water with polymer therein to said upper surface of said web.

9. Apparatus for purifying rinse water as set forth in claim 1 wherein said filter means includes:
a vertically disposed generally cylindrical filter mechanism having upper and lower outlets;
means for introducing the rinse water with polymer therein to said filter mechanism;
means for drawing from the lower outlet polymer which has settled out of the liquid in said filter mechanism; and
means for drawing from the upper outlet purified water which has risen to the top of said filter mechanism.

10. Apparatus for purifying rinse water as set forth in claim 1
wherein said filter means includes:
filter media;
means supporting said filter media disposed in a substantially vertical plane; and
means for causing the water containing the polymer to pass through said filter media.

11. Apparatus for purifying rinse water as set forth in claim 1
wherein said filter means includes:
a plurality of filter plates disposed in a substantially vertical plane;
each of said filter plates including:
a frame;
a sandwich of two stiff supporting sheets with filter media received therebetween in a contiguous relationship, all supported by said frame;
said sheets having first centrally disposed aligned holes therein and a plurality of second outer aligned holes therein; and
conduit means for introducing the water containing the polymer to the first holes and for drawing off the purified water from the plurality of the second holes.

12. Apparatus for purifying rinse water as set forth in claim 11
including:
a bin positioned beneath said frame to receive polymer which has been removed from the rinse water;
wherein said filter plates are movable on said frame between a closed condition in side by side relationship for reception of the water and polymer mixture by said conduit means and an open, separated condition for discharging the polymer into said bin; and
including:
operating means for selectively moving said filter plates between said open and closed conditions.

13. Apparatus for purifying, in a continuous operation, rinse water containing a monomer emulsion of the anaerobic cure or thermal cure variety comprising:
means for introducing to the rinse water a photoinitiator to cause the generation of radicals to initiate polymerization upon exposure to UV energy;
curing means proximate to but spaced from the rinse water for exposing the emulsion to UV energy to cause the emulsion to polymerize;
delivery means for directing uninterrupted flow of the rinse water containing the emulsion past and proximate to said curing means at a rate sufficient to substantially complete polymerization of the emulsion in the rinse water; and
filter means positioned downstream of said curing means to receive from said curing means the irradiated rinse water containing the polymer, said filter means operable for removing the polymer from the rinse water.

14. In combination with apparatus for sealing microporous articles including means for applying uncured resin to an article to be sealed, the resin being a monomer emulsion of the anaerobic or heat cure variety plus a photoinitiator to cause the generation of radicals to initiate polymerization upon exposure to UV energy; first means for rinsing the article in a vessel containing rinse water to remove excess resin from the surface thereof; means for applying a catalyst activator solution to the article to initiate curing of the resin thereon; and second means for rinsing the article to remove the activator solution from the surface thereof; the improvement in apparatus for purifying the rinse water in a continuous operation comprising:
curing means proximate to but spaced from the rinse water for exposing the rinse water containing the monomer emulsion to UV energy to cause the emulsion to polymerize;
delivery means for directing uninterrupted flow of the rinse water containing the emulsion past and proximate to said curing means at a rate sufficient to substantially complete polymerization of the emulsion in the rinse water; and
filter means positioned downstream of said curing means to receive from said curing means the irradiated rinse water containing the polymer, said filter means operable for removing the polymer from the rinse water.

15. The improvement in apparatus for sealing microporous articles as set forth in claim 14 including:
a rinse vessel for initially retaining the rinse water; and
delivery means for drawing the rinse water containing the emulsion from the rinse vessel to a location adjacent said curing means for exposure thereof to UV energy.

16. The improvement in apparatus for sealing microporous articles as set forth in claim 15 including:
conduit means for returning the rinse water purified of the polymer to said rinse vessel.

17. The improvement in apparatus for sealing microporous articles as set forth in claim 14
wherein said filter means includes:
substantially horizontally disposed filter media;
trough means for directing the rinse water with polymer therein onto an upper surface of said filter media; and
reservoir means positioned beneath said filter media for receiving water therein cleansed of the polymer captured by said filter media.

18. The improvement in apparatus for sealing microporous articles as set forth in claim 17 including:
a rinse vessel for initially retaining the rinse water;
delivery means for drawing the rinse water containing the emulsion from said rinse vessel to a location adjacent said curing means for exposure thereof to UV energy;
conduit means including a valve selectively operable, in one instance, for returning the rinse water purified of the polymer to said rinse vessel and, in another instance, for returning the rinse water to said filter means; and
sensing means downstream from said filter means for detecting the clarity of the rinse water purified of the polymer;

said valve means being operable for directing the rinse water to said filter means in the event the clarity thereof is unacceptable and for directing the rinse water to said rinse vessel in the event the clarity thereof is acceptable.

19. The improvement in apparatus for sealing microporous articles as set forth in claim 14 including:

trough means for directing the rinse water with polymer therein to said filter means; and reservoir means positioned beneath said filter means for receiving water therein cleansed of the polymer captured by said filter means; and wherein said filter means includes:

a source of filter media in the form of a continuous web having pores therein of a predetermined size;

conveyor means for supporting said web drawn from said source in a substantially horizontal plane for a finite distance overlying said reservoir means, said web positioned to receive on its upper surface the rinse water with polymer therein from said trough means, said conveyor means being operable for withdrawing a spent section of said web from the position overlying said reservoir means to a distant location for disposal and simultaneously advancing a fresh section thereof into position overlying said reservoir means;

sensing means for detecting the liquid level above said web as the pores therein are closed off by the captured polymer thereon; and drive means responsive to said sensing means when the liquid level above said filter media reaches a predetermined level for operating said conveyor means to withdraw the spent section for disposal and to advance the fresh section into position overlying said reservoir means.

20. The improvement in apparatus for sealing microporous articles as set forth in claim 19 including:

a splash pan intermediate said trough means and said web as it overlies said reservoir means to receive, then redeliver with maximum dispersion, the rinse water with polymer therein to said upper surface of said web.

21. The improvement in apparatus for sealing microporous articles as set forth in claim 14 wherein said filter means includes:

a vertically disposed generally cylindrical filter mechanism having upper and lower outlets;

means for introducing the rinse water containing the emulsion to said filter mechanism;

means for drawing from the lower outlet polymer which has settled out of the liquid in said filter mechanism; and means for drawing from the upper outlet purified water which has risen to the top of said filter mechanism.

22. The improvement in apparatus for sealing microporous articles as set forth in claim 14 wherein said filter means includes:

filter media;

means supporting said filter media disposed in a substantially vertical plane; and means for causing the water containing the polymer to pass through said filter media.

23. The improvement in apparatus for sealing microporous articles as set forth in claim 14 wherein said filter means includes:

a plurality of filter plates disposed in a substantially vertical plane;

each of said filter plates including:

a frame;

a sandwich of two stiff supporting sheets with filter media received therebetween in a contiguous relationship, all supported by said frame;

said sheets having first centrally disposed aligned holes therein and a plurality of second outer aligned holes therein; and conduit means for introducing the water containing the polymer to the first holes and for drawing off the purified water from the plurality of the second holes.

24. The improvement in apparatus for sealing microporous articles as set forth in claim 23 including:

a bin positioned beneath said frame to receive polymer which has been removed from the rinse water;

wherein said filter plates are movable on said frame between a closed condition in side by side relationship for reception of the water containing the polymer by said conduit means and an open, separated condition for discharging the polymer into said bin; and including:

operating means for selectively moving said filter plates between said open and closed conditions.

25. In combination with apparatus for sealing microporous articles including means for applying uncured resin to an article to be sealed, the resin being composed of a monomer emulsion of the anaerobic or heat cure variety plus a photoinitiator to cause the generation of radicals to initiate polymerization upon exposure to UV energy; and means for rinsing the article with the coating of uncured resin thereon in a vessel containing rinse water to remove excess resin from the surface thereof; the improvement in apparatus for purifying the rinse water in a continuous operation comprising:

curing means proximate to but spaced from the rinse water for exposing the rinse water containing the monomer system to UV energy to cause the emulsion to polymerize;

delivery means for directing uninterrupted flow of the rinse water containing the emulsion from said vessel past and proximate to said curing means at a rate sufficient to substantially complete polymerization of the emulsion in the rinse water; and filter means positioned downstream of said curing means to receive from said curing means the irradiated rinse water containing the polymer, said filter means operable for removing the polymer from the rinse water.

26. In combination with apparatus for sealing microporous articles including means for applying uncured resin to an article to be sealed, the resin being composed of a monomer emulsion of the anaerobic cure or thermal cure variety plus a photoinitiator to cause the generation of radicals to initiate polymerization upon exposure of UV energy; first means for rinsing the article in a vessel containing rinse water to remove excess resin from the surface thereof; means for applying a catalyst activator solution to the article to initiate curing of the resin thereon; and second means for rinsing the article to remove the activator solution from the surface thereof; the improvement in apparatus for purifying the rinse water in a continuous operation comprising:

means for introducing to the rinse water a photoinitiator to cause the generation of radicals to initiate polymerization upon exposure to UV energy;

curing means proximate to but spaced from the rinse water for exposing the rinse water containing the monomer emulsion to UV energy to cause the emulsion to polymerize;

delivery means fir directing uninterrupted flow of the rinse water containing the emulsion past and proximate to said curing means at a rate sufficient to substantially complete polymerization of the emulsion in the rinse water; and filter means positioned downstream of said curing means to receive from said curing means the irradiated rinse water containing the polymer, said filter means operable for removing the polymer from the rinse water.

* * * * *